United States Patent
Gonzales et al.

(10) Patent No.: US 12,160,111 B2
(45) Date of Patent: *Dec. 3, 2024

(54) METHOD FOR CONTROLLING AN ELECTRICAL TRANSMISSION NETWORK

(71) Applicants: Supergrid Institute, Villeurbanne (FR); Centralesupelec, Gis-sur-Yvette (FR); Centre National De La Recherche Scientifique, Paris (FR); Universite Paris-Saclay, Saint Aubin (FR)

(72) Inventors: Juan Carlos Gonzales, Lyons (FR); Valentin Costan, Lyons (FR); Gilney Damm, Lyons (FR); Abdelkrim Benchaib, Lyons (FR); Françoise Lamnabhi-Lagarrigue, Lyons (FR); Bruno Luscan, Lyons (FR)

(73) Assignees: Supergrid Institute, Villeurbanne (FR); Centralesupelec, Gis-sur-Yvette (FR); Centre National De La Recherche, Paris (FR); Universite Paris-Suclay, Saint Aubin (FR)

( * ) Notice: Subject to any disclaimer, the term of this patent is extended or adjusted under 35 U.S.C. 154(b) by 339 days.

This patent is subject to a terminal disclaimer.

(21) Appl. No.: 17/621,579

(22) PCT Filed: Jun. 25, 2020

(86) PCT No.: PCT/EP2020/067921
§ 371 (c)(1),
(2) Date: Dec. 21, 2021

(87) PCT Pub. No.: WO2020/260513
PCT Pub. Date: Dec. 30, 2020

(65) Prior Publication Data
US 2022/0360089 A1 Nov. 10, 2022

(30) Foreign Application Priority Data
Jun. 26, 2019 (FR) ...................................... 1906969

(51) Int. Cl.
*H02J 5/00* (2016.01)
*G05B 19/042* (2006.01)
(Continued)

(52) U.S. Cl.
CPC .............. *H02J 5/00* (2013.01); *G05B 19/042* (2013.01); *H02J 3/36* (2013.01); *H02J 3/381* (2013.01);
(Continued)

(58) Field of Classification Search
CPC ...... H02J 5/00; H02J 3/36; H02J 3/381; H02J 3/48; H02J 3/46; G05B 19/042; G05B 2219/2639; Y02E 60/60
(Continued)

(56) References Cited

U.S. PATENT DOCUMENTS

| 2012/0201059 A1 | 8/2012 | Berggren et al. |
| 2017/0207630 A1 | 7/2017 | Dong et al. |

(Continued)

FOREIGN PATENT DOCUMENTS

| EP | 3035476 A1 | 6/2016 |
| WO | 2012175110 A1 | 12/2012 |

(Continued)

OTHER PUBLICATIONS

Renedo, J. et al., "Active Power Control Strategies for Transient Stability Enhancement of AC/DC Grids With VSC-HVD Multi-Terminal Systems", IEEE Transactions on Power Systems, vol. 31, No. 6.

*Primary Examiner* — Richard Tan
(74) *Attorney, Agent, or Firm* — GableGotwals

(57) ABSTRACT

A method for controlling an electrical transmission network including a plurality of DC high-voltage lines and at least three AC/DC converters identified by a respective index i. For each of the converters having index i, the method
(Continued)

includes recovering the setpoint active power value Pdci applied thereto, and recovering instantaneous voltage value Vi and voltage angle value θi of the buses having index i and modifying the setpoint active power Pdci of each of the converters having index i by a value including a term ΔPdcsi as a function of a sum of deviations of voltage angles multiplied by contribution adjustment parameters.

8 Claims, 6 Drawing Sheets

(51) Int. Cl.
*H02J 3/36* (2006.01)
*H02J 3/38* (2006.01)
*H02J 3/48* (2006.01)

(52) U.S. Cl.
CPC ........ *H02J 3/48* (2013.01); *G05B 2219/2639* (2013.01)

(58) Field of Classification Search
USPC .......................................................... 307/82
See application file for complete search history.

(56) References Cited

U.S. PATENT DOCUMENTS

2017/0250540 A1* 8/2017 Varma ....................... H02J 3/46
2022/0352719 A1* 11/2022 Gonzales ................. H02J 5/00

FOREIGN PATENT DOCUMENTS

| WO | 2014053171 A1 | 4/2014 |
| WO | 2019097183 A1 | 5/2019 |

* cited by examiner

[Fig. 1]
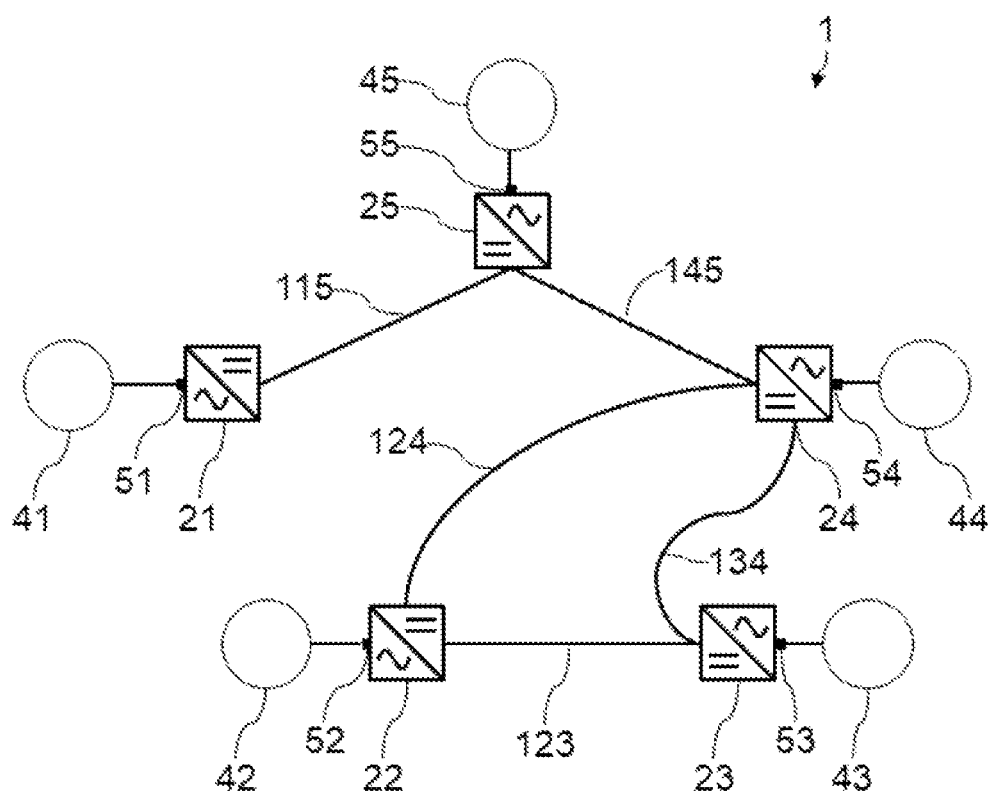

[Fig. 2]
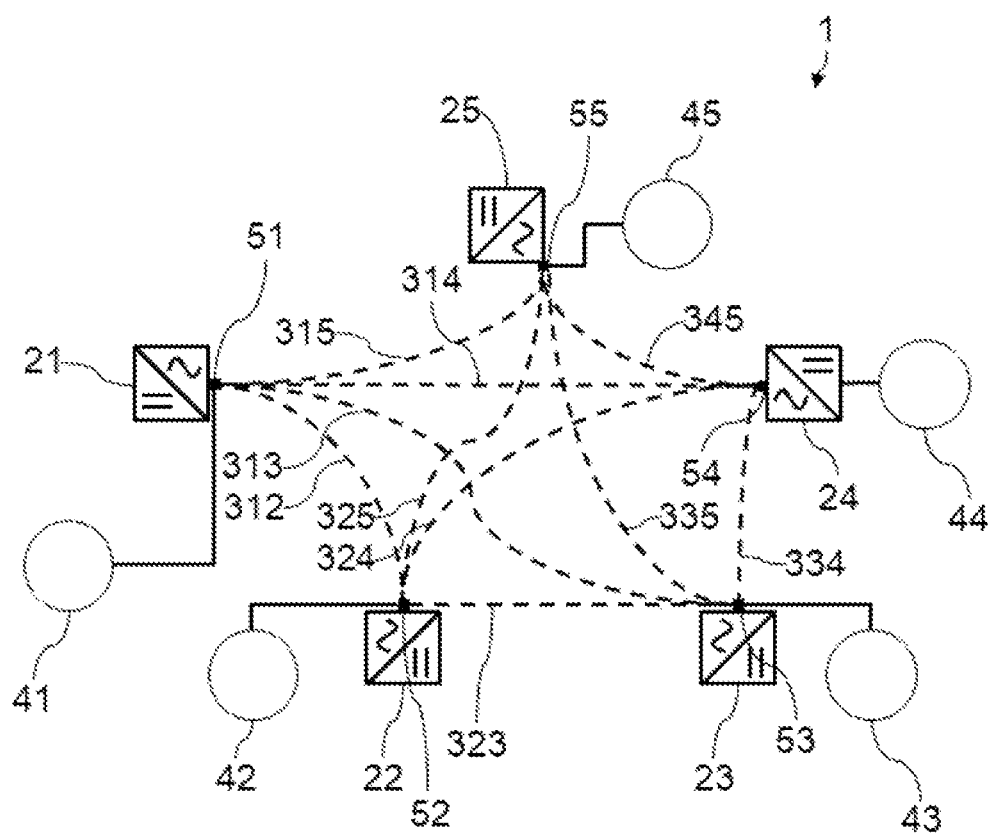

[Fig. 3]
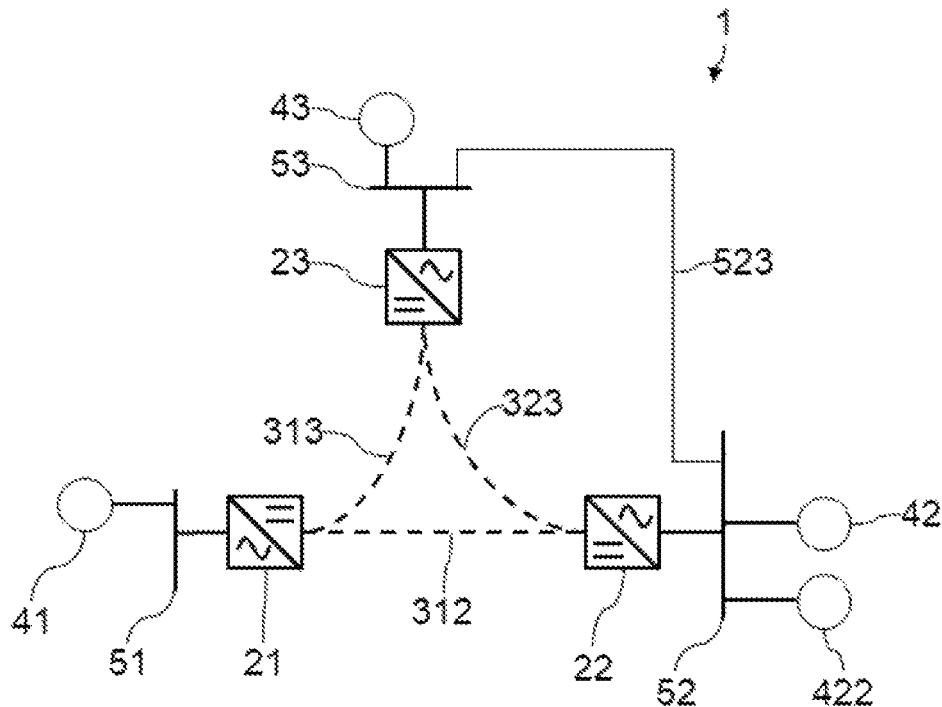
[Fig. 4]
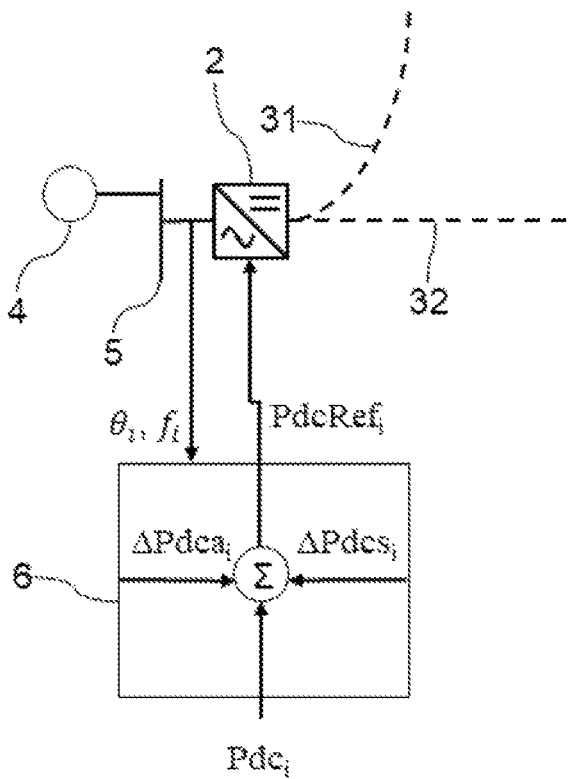

[Fig. 5]
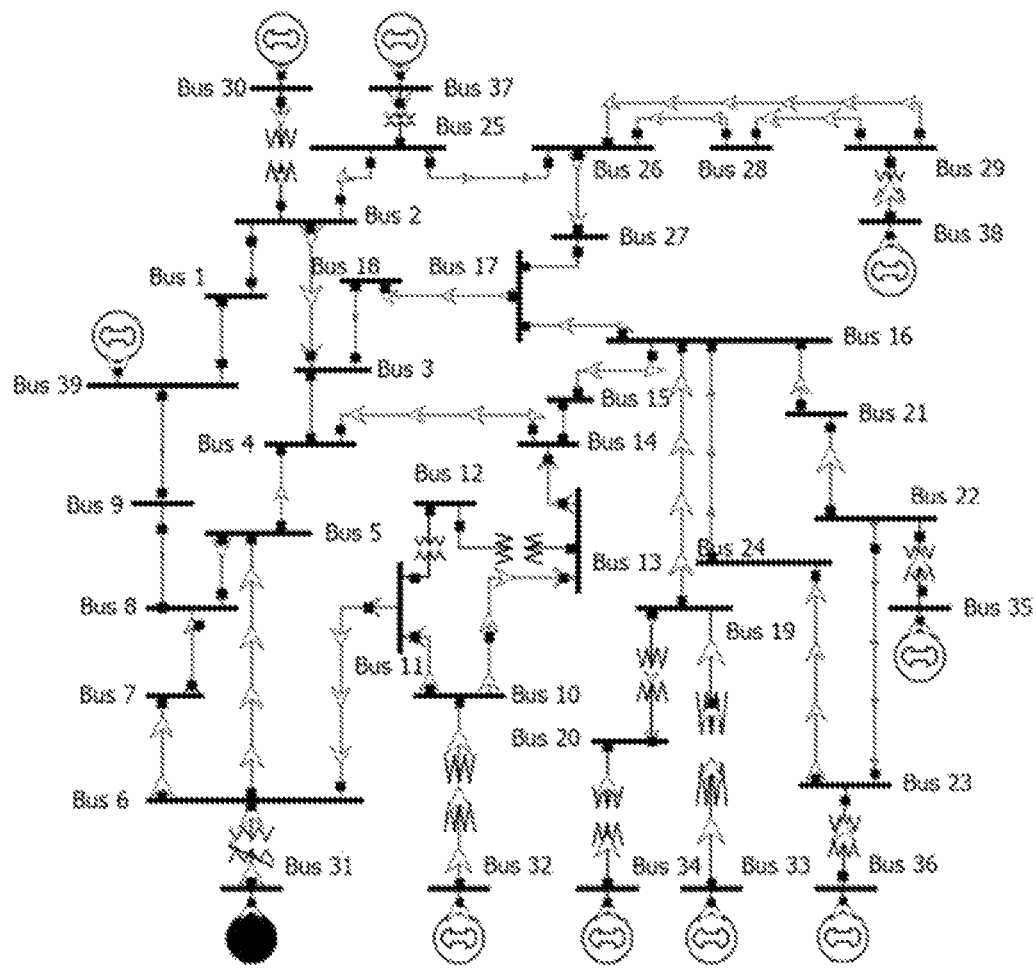

[Fig. 6]
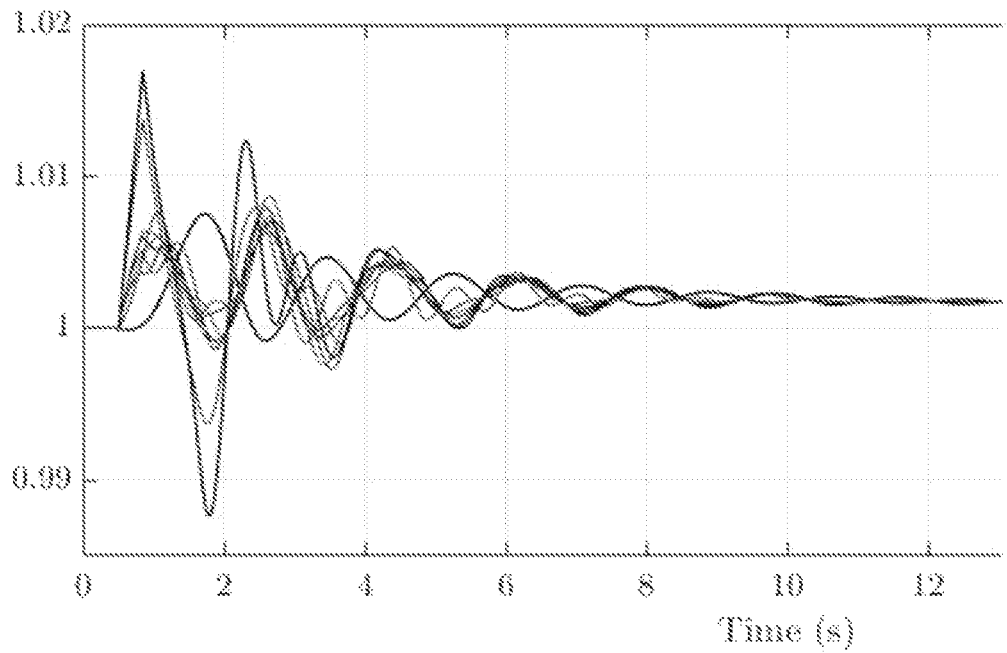
[Fig. 7]
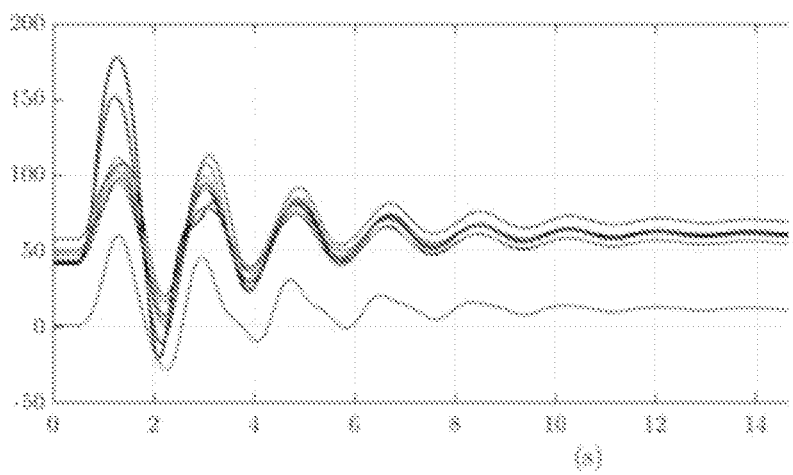

[Fig. 8]
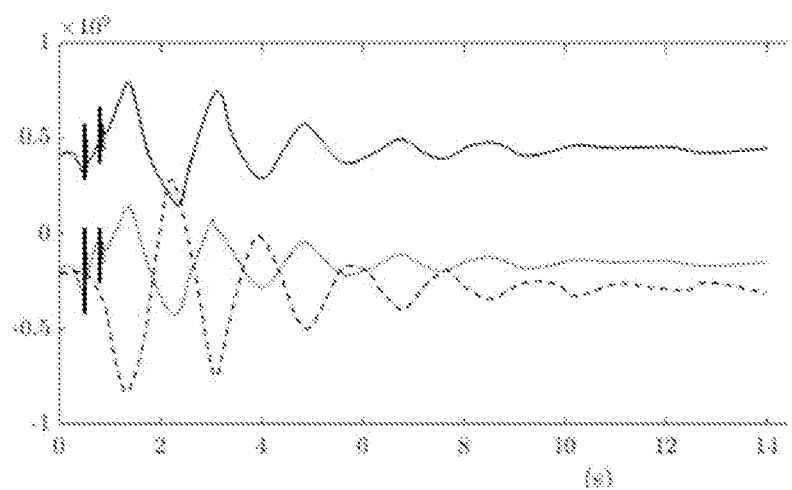

METHOD FOR CONTROLLING AN ELECTRICAL TRANSMISSION NETWORK

CROSS-REFERENCE TO RELATED APPLICATIONS

This United States application is the National Phase of PCT Application No. PCT/EP2020/067921 filed 25 Jun. 2020, which claims priority to French Patent Application No. 1906969 filed 26 Jun. 2019, each of which is incorporated herein by reference.

The invention relates to strategies for controlling electrical networks, in particular to control strategies for ensuring the stability of electrical networks including several converter stations of a meshed DC network connected via several DC power lines, designed to allow power exchange between AC buses.

Integration of meshed DC networks into AC networks is a promising technology to allow control of active and reactive power and to facilitate input of power from renewable sources into the AC network.

A malfunction in the network is sometimes manifested by a transient power imbalance, with some generators accelerating and others decelerating. We can then observe an evolution of the phase shift between the AC voltage buses of the network. If the system cannot return to equilibrium after a disturbance, it can become unstable because the power generators can run asynchronously and power exchange can no longer be assured. For example, power generators can become disconnected from the network.

Such integration of meshed DC networks does, however, in practice reduce the margin of transient stability of these AC networks. This makes it easier for such networks to become unstable after major disturbances.

The publication entitled 'Active Power Control Strategies for Transient Stability Enhancement of AC/DC Grids With VSC-HVDC Multi-Terminal Systems', by Javier Renedo et al., in IEEE Transactions on Power Systems, vol. 31, no. 6, pages 4595-4605 in November 2016, describes a control solution for improving transient stability of AC networks. In this solution, different conversion point converters are interconnected by means of high voltage DC lines, with a point-to-point link being formed between each pair of converters. In particular, this document proposes measuring the frequencies on each of the AC buses and subsequently applying a correction to the active power setpoint of each of the DC network converters, wherein the correction to the active power of a converter is a function of a frequency measurement on the AC network bus connected to this converter. The frequency on an AC bus may also be identified as the angular velocity of the voltage. Instantaneous angular velocity measurement can be performed using a phasor measurement unit.

Such a control method proves inadequate in providing a sufficient increase in the transient stability margin, particularly during specific disturbances.

The invention aims to overcome one or more of these drawbacks. The invention thus relates to a method for controlling an electrical transmission network, as defined in the appended claims.

The invention also relates to the variants of the dependent claims. A person skilled in the art will understand that each of the characteristics of the description or of a dependent claim may be combined independently with the characteristics of an independent claim, without this constituting an intermediate generalisation.

Other characteristics and advantages of the invention will become clearly apparent from the description thereof that is given below, by way of non-limiting indication, with reference to the appended drawings, in which:

FIG. 1 is a schematic representation of an example of an electrical distribution network for implementation of the invention.

FIG. 2 represents virtual AC connections that can be emulated by the network in FIG. 1;

FIG. 3 represents a simplified network with interconnection between AC network buses;

FIG. 4 is a diagram illustrating an example of a method of controlling a converter in a system according to the invention;

FIG. 5 represents a reference network used to carry out simulations;

FIG. 6 is a diagram illustrating the evolution of the speed of the reference network generators during implementation of the invention;

FIG. 7 is a diagram illustrating the evolution of the phase shift between the reference network generators during implementation of the invention;

FIG. 8 is a diagram illustrating the evolution of the powers of converters employed by a control method according to the invention in the reference network.

FIG. 1 schematically illustrates an example of an electrical distribution network 1, incorporating a high-voltage DC network with multiple converter stations. The electrical distribution network thus comprises converter stations, each including a respective AC/DC converter. The converter stations include converters, 21 to 25, respectively. The converters 21 to 25 are, for example, modular multilevel converters. Each of the converters 21 to 25 has a DC interface connected to at least one DC interface of another converter, via a high-voltage DC line. The DC interfaces of the converters 21 and 25 are thus connected via the high-voltage line 115, the DC interfaces of the converters 24 and 25 are thus connected via the high-voltage line 145, the DC interfaces of the converters 21 and 23 are thus connected via the high-voltage line 123, the DC interfaces of the converters 22 and 24 are thus connected via the high-voltage line 124, and the DC interfaces of the converters 23 and 24 are thus connected via the high-voltage line 123.

Thus, the invention can be implemented for cases where there are no point-to-point high voltage DC links between the DC interfaces of each of the pairs of converters. Thus, there is no DC high-voltage line between converters 21 and 22, between converters 21 and 23, between converters 21 and 24, between converters 22 and 23, between converters 22 and 25, and between converters 23 and 25.

In addition, each of the converters 21 to 25 includes a respective AC interface. The AC interface of each of the converters 21 to 25 is connected to an AC voltage bus 51 to 55, respectively. Each of the buses 51 to 55 is connected to an AC network 41 to 45, respectively. In the example illustrated, there are no interconnections between the AC networks 41 to 45. One may, however, contemplate interconnections between some of the AC networks, as in the simplified example shown in FIG. 3. Hence, in the example in FIG. 3, a link 523 connects the bus 53 to the bus 52. Two machines 42 and 422 are connected here to the bus 52.

Functioning at a converter station including a converter 2 for the implementation of the invention is illustrated by means of the diagram in FIG. 4. The following operations are carried out for each of the converters 2 of the converter stations. For a converter 2 of index i, the operator supplies an active power setpoint value $Pdc_i$. The control circuit 6 of the converter 2 thus recovers this active power setpoint value $Pdc_i$. The control circuit 6 recovers instantaneous values of voltage Vi, of voltage angle $\theta_i$ and advantageously of frequency $f_i$ of this voltage, on the AC voltage bus 5 connected to the AC network 4. The values Vi, $\theta_i$ and $f_i$ can be recovered by a phase-locked loop on the bus 5. The continuous interface of the converter 2 is connected in this case to the high-voltage DC lines 31 and 32, for point-to-point connection with other converters of other converter stations.

The control circuit 6 modifies the active power setpoint $Pdc_i$, by applying an active power setpoint value $PdcRef_i$ to the converter 2, adding a term $\Delta Pdcs_i$ to the active power setpoint value $Pdc_i$, with:

$$\Delta P_{dcs_i} = \sum_{j=1}^{n} k_{\delta_{ij}}\left((\theta_i - \theta_j) = \theta ref_{ij}\right) \text{ with } i \neq j \text{ and } k_{\delta_{ij}} = k_{\delta_{ji}} \quad [\text{Math. 3}]$$

where n is the number of converters connected to the AC voltage buses, $k\delta_{ij}$ is an adjustment parameter of contribution to a corrective power of synchronization and $\theta ref_{ij}$ is a reference of the difference in angles between buses i and j in steady state. Advantageously, $\theta ref_{ij}$ has a non-zero value to take account of a reference phase shift between the buses i and j.

With such a mode of operation, at least one synchronizing power term can be added between each pair of converters, even if there is no point-to-point high-voltage link between these converters. Such a mode of operation is transparent for the network operator, so that the operator only needs to supply the active power setpoint values $Pdc_i$ to the converters.

Advantageously, the control circuit 6 modifies the active power setpoint $Pdc_i$, by applying the active power setpoint value $PdcRef_i$ to the converter 2, adding a term $\Delta Pdca_i$ to the active power setpoint value $Pdcs_i$, with:

$$\Delta P_{dca_i} = \sum_{j=1}^{n} k_{f_{ij}}(f_i - f_j) \text{ with } i \neq j \text{ and } k_{f_{ij}} = k_{f_{ji}} \quad [\text{Math. 4}]$$

where $kf_{ij}$ is an adjustment parameter of contribution to a corrective damping power.

The active power setpoint value $PdcRef_i$ may in this case adopt the following value:

$$P_{dcRef_i} = P_{dc_i} + \Delta P_{dca_i} + \Delta P_{dcs_i} \quad [\text{Math. 5}]$$

For the example of a simplified network illustrated in FIG. 3, the active power setpoint values for the converters 21 to 23 are as follows:

$$P_{dcRef1} = P_{dc1} + k_{\delta_{12}}(\theta_1 - \theta_2) + k_{\delta_{12}}(\theta_1 - \theta_3) + k_{f_{12}}(f_1 - f_2) + k_{f_{13}}(f_1 - f_3) \quad [\text{Math. 6}]$$

$$P_{dcRef2} = P_{dc2} + k_{\delta_{21}}(\theta_2 - \theta_1) + k_{\delta_{23}}(\theta_3 - \theta_1) + k_{f_{21}}(f_2 - f_1) + k_{f_{23}}(f_2 - f_3) \quad [\text{Math. 7}]$$

$$P_{dcRef3} = P_{dc3} + k_{\delta_{31}}(\theta_3 - \theta_1) + k_{\delta_{22}}(\theta_3 - \theta_2) + k_{f_{31}}(f_3 - f_1) + k_{f_{32}}(f_3 - f_2) \quad [\text{Math. 8}]$$

For calculation of the parameters $k\delta_{ij}$ and $kf_{ij}$, account is taken of the fact that the dynamics of the high-voltage DC network are much greater than the dynamics of the AC networks and the electromechanical machines connected to them. The algebraic equations describing the behaviour of the high-voltage DC network can thus neglect the latter's dynamics, by representing each converter station by its current input model.

In the absence of any significant energy storage device in the high-voltage DC network, the sum of the powers fed into this high-voltage DC network is defined as equal to the sum of the powers exiting this high-voltage DC network. In the example in FIG. 3, the following equation must be observed:

$$P_{dcRef1} + P_{dcRef2} + P_{dcRef3} = 0 \quad [\text{Math. 9}]$$

Furthermore, during normal operation, the current and voltage control ensures the following equation:

$$P_{dc1} + P_{dc2} + P_{dc3} = 0 \quad [\text{Math. 10}]$$

The contribution adjustment parameters must then obey the following rule:

$$k_{\delta_{ij}} = k_{\delta_{ji}} \text{ et } k_{f_{ij}} = k_{f_{ji}} \quad [\text{Math. 11}]$$

By ensuring that the sum of the setpoint powers is always zero even with the corrective terms, it is possible to implement such calculations in a higher layer in any type of control. The invention can therefore be easily implemented both when the high-voltage DC network is configured as a master/slave system and when the high-voltage DC network is configured so that the converter stations operate under voltage-droop control.

The synchronizing power term behaves as a transmission line between the converters i and j. In order to emulate a transmission line between converters i and j, all that is required is to calculate an appropriate gain $k\delta_{ij}$.

From the multipoint high-voltage DC network 1, a network of virtual admittances connected to the AC buses can be emulated, even if there are no connections between these AC buses. It can thus be noted that a high-voltage DC network with n number of converter stations has n−1 number of degrees of freedom. FIG. 2 therefore shows virtual AC connections that can be emulated by the network 1 in FIG. 1 with the control method described. Hence, an AC link can be emulated between the AC interface of one of the converter stations 21 to 25, and the AC interface of each of the others of these converter stations 21 to 25. As illustrated:

- AC links 312 to 315 can be emulated between the AC interface of the converter 21 on the one hand and a respective AC interface of each of the converters 22 to 25;
- AC links 323 to 325 can be emulated between the AC interface of the converter 22 on the one hand and a respective AC interface of each of the converters 23 to 25;
- AC links 334 and 335 can be emulated between the AC interface of the converter 23 on the one hand and a respective AC interface of each of the converters 24 and 25;
- an AC link 345 can be emulated between the AC interface of the converter 24 on the one hand and a respective AC interface of the converter 25.

Thus, corrective synchronization power or corrective damping power can always be integrated between two converter stations of the network 1, even if there is no point-to-point high-voltage DC link between these converter stations.

Generally speaking, such a multipoint AC network with a number m of nodes connected to external systems can be reduced to a pattern of lines between these m nodes, by the Kron reduction method.

In particular, the input of synchronization power into the AC network can be achieved in two ways according to the invention.

According to a first solution:

$$\Delta P_{dcs_i} = \sum_{j=1}^{n} k_{\delta_{ij}}\left((\theta_i - \theta_j) - \theta ref_{ij}\right) \quad \text{[Math. 12]}$$

θref$_{ij}$ is a reference angle difference calculated by the power flow calculation and determined by a control layer, for example the secondary control.

According to a second solution, the gains kδ$_{ij}$ are calculated in order to obtain the desired equilibrium point. Thus, if the network operator wishes to obtain the power Pdc$_0$ in a steady state, the operator will wish to input synchronization power only between the buses of indices i and j. This power can be broken down as follows:

$$P_{dcs_0} = P_0 + k_{\delta_{ij}}(\theta_i - \theta_j) \quad \text{[Math. 13]}$$

The values of $P_0$ and kδ$_{ij}$ can therefore be defined in order to obtain the desired value of Pdcs$_0$, in steady state.

The power transmitted between the converter stations i and j per virtual or emulated transmission line can be defined as follows:

$$P_{Vij} = V_i * V_j * Y_{ij} * \sin(\theta_i - \theta_j) \quad \text{[Math. 14]}$$

Where Y$_{ij}$ is a dynamic virtual admittance value emulated between the AC interfaces of the converter stations i and j.

Since Vi and Vj have known values, the desired behaviour can be emulated for the admittance value Y$_{ij}$.

The reference power desired by the operator of the network 1 can be defined as follows:

$$P_{dcs_0} = P_0 + k_{\delta_{ij}} * \sin(\theta_i - \theta_j) \quad \text{[Math. 15]}$$

Where kδ$_{ij}$=Vi*Vj*Y$_{ij}$. The operator of the network 1 may calculate only the term $P_0$ or set $P_0$=0.

Simulations were carried out for the example of the IEEE New England Power Grid Model comprising 39 AC buses and 10 generators, as shown in FIG. 5. In the simulation example, the network has three AC-DC converter stations. In this model, the AC interface of a converter station is connected to the bus with the reference 39. The AC interface of another converter station is connected to the bus with the reference 16. The AC interface of another converter station is connected to the bus with the reference 19.

A fault occurring on the line between the buses with the references 5 and 8 has been assumed. It is observed that by maintaining the setpoint powers of the converters constant, the generators connected to the buses with the references 31 and 10 gradually become desynchronized and eventually isolated from the system.

On applying a control method according to the invention, the results shown in FIG. 6 were obtained. The diagram in FIG. 6 illustrates the evolution of the speed of the generators as a function of time, following occurrence of a fault on the line between the buses with the references 5 and 8. It is noted that after the fault, all generators experience an oscillation. This oscillation is however damped and the rotation speeds of the generators reach a stable value after a few seconds.

FIG. 7 illustrates the angular phase shift between the reference generator 1 and the other generators when using a control method according to the invention. It is noted that after a fault, the phase shift oscillates but remains limited. The phase shift is quickly damped and stabilises at a constant value after a few seconds for each of the other generators.

FIG. 8 is a diagram showing the power modulated by the converters, when implementing a control process according to the invention. The power modulations implemented via the corrective terms at the three converter stations make it possible to obtain the results illustrated above.

The invention claimed is:

1. A method of controlling an electrical transmission network, wherein the electrical transmission network comprises high voltage DC lines, AC/DC converters and AC voltage buses, where AC is alternating current and DC is direct current; there being at least n of the AC/DC converters, where n≥3, the n AC/DC converters interconnected by the high voltage DC lines and connected to at least one of the AC voltage buses, where i indicates at least one AC voltage bus of the AC voltage buses to which each of the n AC/DC converters is connected, the method comprising
   recovering applied active power setpoint value Pdc$_i$ for each of the n AC/DC converters;
   recovering instantaneous values V$_i$ of voltage and θ$_i$ of voltage angle of the at least one AC voltage bus i;
   modifying the active power setpoint value Pdc$_i$ of each of the n AC/DC converters by a value including a term ΔPdcs$_i$ with:

ΔPdcs$_i$=Σ$_{j=1}^{n}$((θi−θj))=θrefij) with i≠j and kδij=kδji where j indicates any other of the AC voltage buses different than the at least one AC voltage bus i, and
   where kδ$_{ij}$ being a contribution adjustment parameter, and
   where θref$_{ij}$ being a reference of a difference in angles between the at least one AC voltage bus i and the any other of the AC voltage buses j in steady state.

2. The method of controlling the electrical transmission network according to claim 1, wherein θref$_{ij}$ has a non-zero value.

3. The method of controlling the electrical transmission network according to claim 1, wherein the method comprises:
   recovering instantaneous values f$_i$ of frequency of the voltage of the at least one AC voltage bus i;
   changing a desired active power Pdc$_i$ of each of the AC/DC converters by a value including a ΔPdca$_i$ term with:

ΔPdca$_i$=Σ$_{j=1}^{n}$kfij(fi−fj) with i≠j and kfij=kfji kf$_{ij}$, a contribution adjustment parameter.

4. The method of controlling the electrical transmission network according to claim 1, wherein at least two of said AC voltage buses are interconnected.

5. The method of controlling the electrical transmission network according to claim 1, wherein none of said AC voltage buses are interconnected.

6. The method of controlling the electrical transmission network according to claim 1, wherein at least two of said AC/DC converters do not have their DC interfaces connected point to point via a high-voltage DC line.

7. The method of controlling the electrical transmission network according to claim 1, wherein the term ΔP$_{dcdi}$ is calculated by an index converter calculation circuit.

8. The method of controlling the electrical transmission network according to claim 1, wherein a desired active power of each of said AC/DC converters is modified by a term ΔPdcd$_i$ for estimating a network disturbance.

\* \* \* \* \*